United States Patent [19]

Thies et al.

[11] 4,445,332

[45] May 1, 1984

[54] HYDRAULIC HOSE ASSEMBLY AND METHOD

[75] Inventors: Jerome A. Thies, Geneseo, Ill.; Mark E. Tietje, Davenport, Iowa

[73] Assignee: Caterpillar Tractor Co., Peoria, Ill.

[21] Appl. No.: 361,307

[22] Filed: Mar. 24, 1982

[51] Int. Cl.³ .............................................. F16L 39/02
[52] U.S. Cl. ...................................... 60/455; 285/226; 285/373; 285/13; 285/133 R
[58] Field of Search .................. 285/226, 373, 419, 13, 285/302, 133 R, 351; 60/455

[56] References Cited

U.S. PATENT DOCUMENTS

| | | | |
|---|---|---|---|
| 2,838,074 | 6/1958 | Lauck | 138/49 |
| 2,867,242 | 1/1959 | Harris et al. | 285/226 |
| 2,956,586 | 10/1960 | Zeigler et al. | 285/133 R |
| 3,001,804 | 9/1961 | Tomlinson et al. | 285/302 |
| 3,299,417 | 1/1967 | Sibthorpe | 340/242 |
| 4,108,476 | 8/1978 | Krupp | 285/158 |
| 4,243,253 | 1/1981 | Rogers, Jr. | 285/226 |
| 4,274,549 | 6/1981 | Germain | 285/133 R |

FOREIGN PATENT DOCUMENTS 462273 7/1928 Fed. Rep. of Germany .

*Primary Examiner*—Robert E. Garrett
*Assistant Examiner*—Randolph Smith
*Attorney, Agent, or Firm*—Phillips, Moore, Lempio & Finley

[57] ABSTRACT

High-pressure hydraulic hoses are employed in hydrostatic drive systems to interconnect the transmission and motors thereof. It is imperative that fluid leakage be held to a minimum, or preferably eliminated, particularly where a vehicle employing the drive system is operated in a high-temperature environment, such as a foundry. The hose assembly (13) of this invention provides a high degree of system reliability, relative to hydraulic leaks, and shields a high-pressure hose thereof (14) against damage and heat conduction to hydraulic fluid therein. The hose assembly (13) comprises a flexible high-pressure hose (14), an impervious flexible jacket (17) surrounding the hose in out-of-contact relationship therewith to define a fluid chamber (18) therebetween, and a mounting assembly (22) for mounting the hose (14) and the jacket (17) on a support member (23) to maintain them in out-of-contact relationship relative to each other. The mounting assembly (22) includes a first mount (26) for securing the hose on the support member (23) under a predetermined first sealing pressure, and a second mount (34) for securing the jacket (17) about the hose and on the support member (23) under a predetermined second sealing pressure that is less than the first sealing pressure. Method steps are taught for assembling the hose assembly (13) in this manner.

24 Claims, 3 Drawing Figures

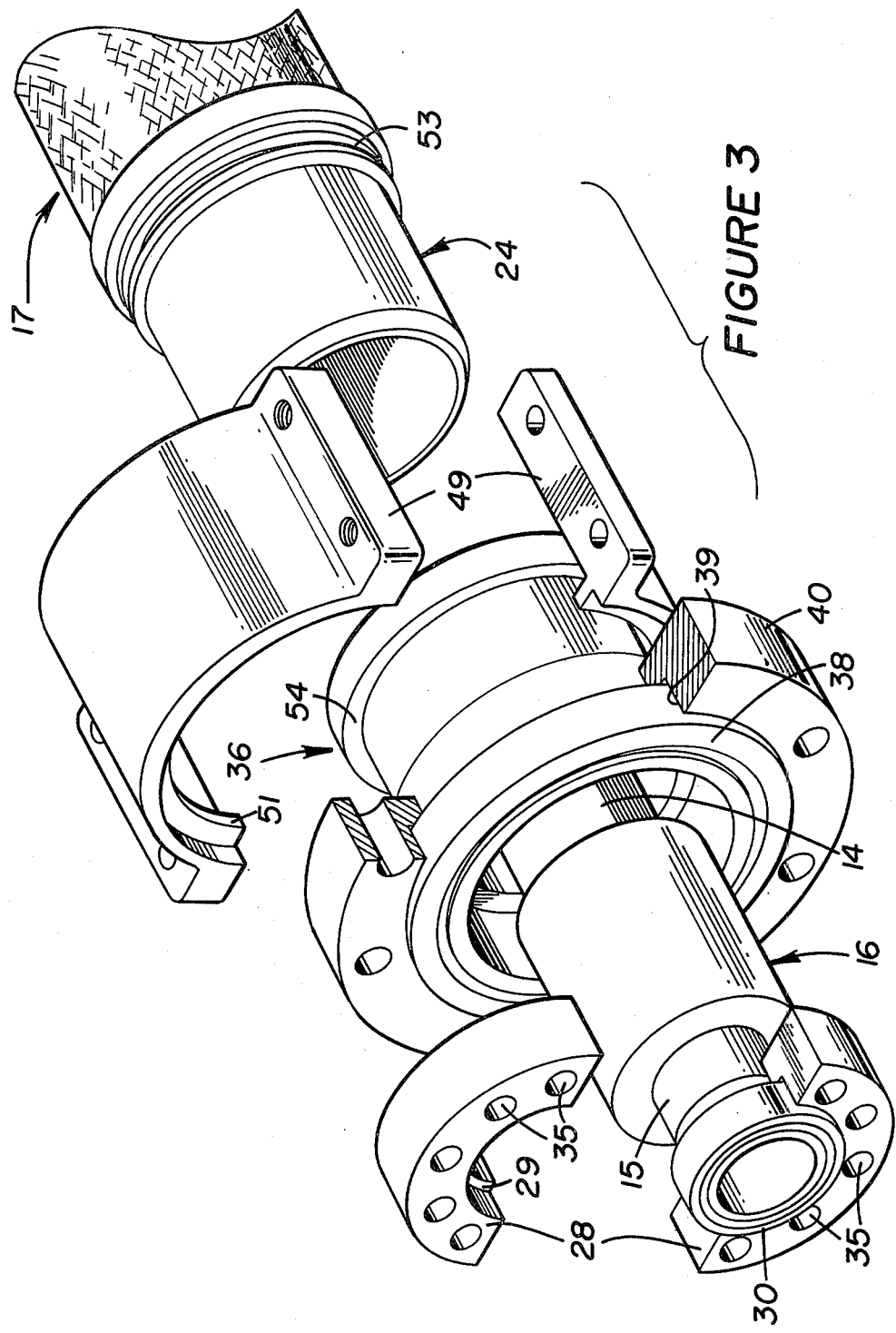

[4,445,332]

HYDRAULIC HOSE ASSEMBLY AND METHOD

DESCRIPTION

1. Technical Field

This invention relates generally to a high-pressure hose assembly and more particularly to the mounting of a flexible high-pressure hose within a jacket to define a fluid chamber therebetween.

2. Background Art

Hydrostatic drive systems have found useful application to construction and industrial vehicles, such as track-type loaders. In loader applications, a transmission, including an engine-driven pump, is connected to a fluid motor which powers each drive sprocket of the loader. The pump and motor are interconnected by a pair of flexible high-pressure hoses for intercommunicating hydraulic fluid therebetween at a working pressure approximating 41,370 kPa.

Since the pump and motor are placed at a substantial distance from each other on the loader, failure of an exposed portion of one of the interconnecting hoses could result in the loss of large quantities of working fluid to immobilize the loader. In addition, high pressure leaks can cause misting or spraying of the fluid into the surrounding environment. Various factors tend to reduce hose life, including mechanical stresses imposed on the hose and operation of the loader in a high-temperature environment, such as a foundry. Such stresses may be induced by the relative motion occurring between the transmission and motor during loader operation.

Although flexible metal hoses, commonly including a corrugated tube covered with a metal, braided sheath, are widely used, they are normally inapplicable to large high-pressure applications, such as those encountered with hydrostatic drive systems. In addition, metallic hoses of this type conduct heat to the hydraulic working fluid therein when they operate in a high-temperature environment.

The present invention is directed to overcoming one or more of the problems as set forth above.

DISCLOSURE OF INVENTION

In one aspect of this invention, a hose assembly comprises a flexible high-pressure hose, an impervious flexible jacket surrounding the hose to define a fluid chamber therebetween, and mounting means for mounting the hose and jacket on a support member to maintain them in out-of-contact relationship relative to each other to define the fluid chamber.

In another aspect of this invention, the mounting means comprises first mounting means for mounting the hose on the support member under a predetermined first sealing pressure and second mounting means for mounting the jacket on the support member under a predetermined second sealing pressure that is less than the first sealing pressure.

In still another aspect of this invention, a method for mounting the hose assembly on the support member comprises the steps of mounting the hose in protected relationship within the jacket, clamping the hose on the support member under the first sealing pressure, and clamping the jacket on the support member under the second sealing pressure that is less than the first sealing pressure.

The hose, mounting assembly, and method of this invention will thus provide an integrated system exhibiting a high degree of serviceability and reliability, relative to hydraulic fluid leaks. In addition, the jacket will protect the hose against abrasion, and rubber degrading oils, and will also isolate the hose to prevent direct conduction of ambient heat thereto. The containment of fluid leakage in the chamber, defined between the hose and jacket, will enable the system to return such fluid as a harmless flow back to the sump of a hydrostatic drive system, for example. The system is also capable of maintaining sufficient charge pressure under drive line failure conditions to prevent complete vehicle shut-down, allowing at least partial mobility of the vehicle.

BRIEF DESCRIPTION OF THE DRAWINGS

Other advantages and objects of this invention will become apparent from the following description and accompanying drawings wherein:

FIG. 2 is an enlarged and sectioned side elevational view of a mounting assembly for attaching the hose assembly to a pump of a hydrostatic drive system or the like; and FIG. 3 is an exploded, isometric view of the mounting assembly.

BEST MODE OF CARRYING OUT THE INVENTION

Figure 1:
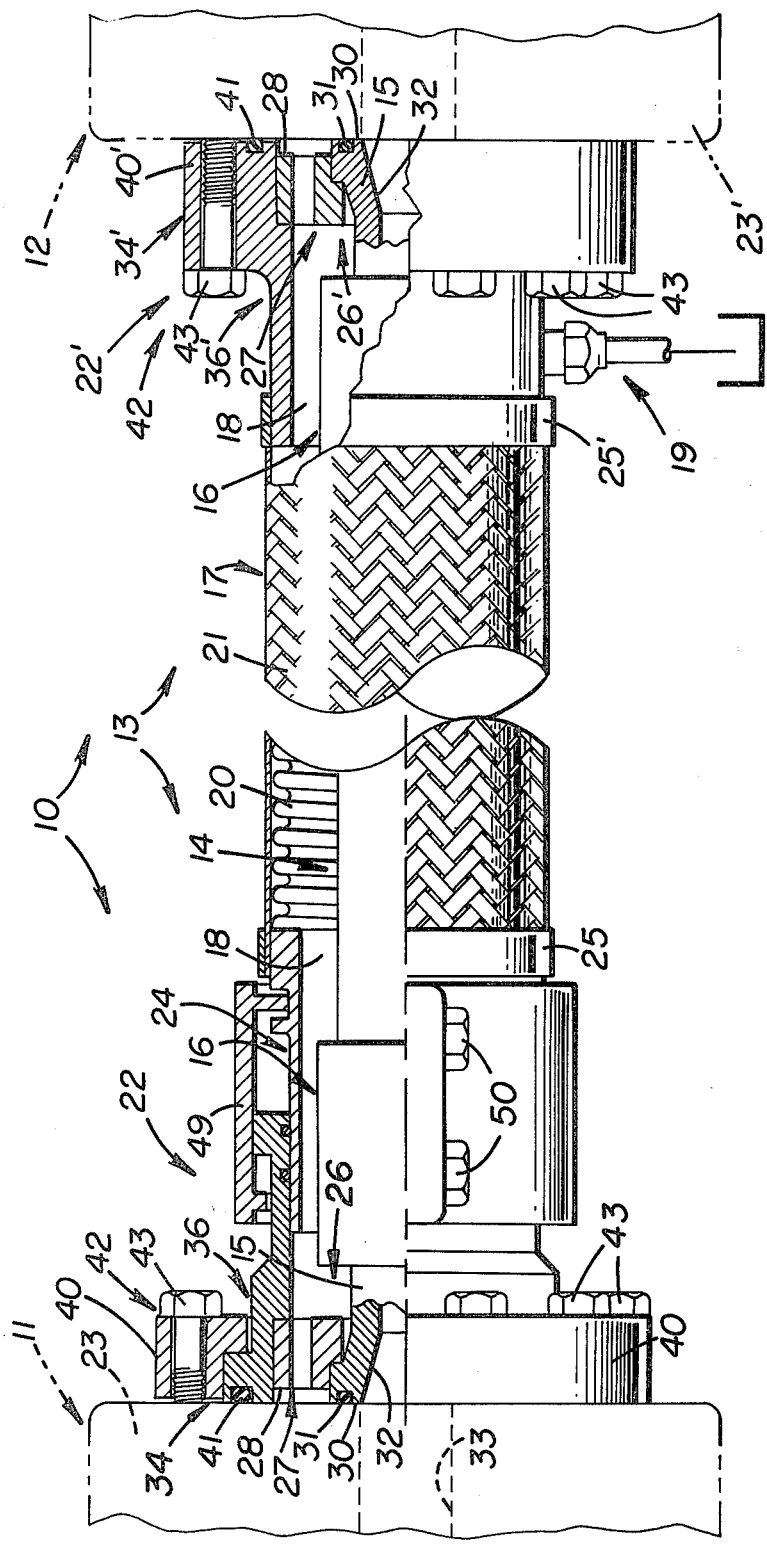
FIG. 1 is a side elevational view of a hose assembly embodiment of the present invention with parts broken-away for clarification purposes.

FIG. 1 partially illustrates a hydrostatic drive system 10 adapted for use on a track-type vehicle, such as a track-type loader. In particular, the system includes a motor 11 connected to a transmission 12 by a pair of hose assemblies 13 (one shown). A motor is suitably connected to each drive sprocket (not shown) of the loader in a conventional manner to provide the power input thereto. The transmission includes a power take-off from the engine, a pair of variable displacement pumps each connected to a motor, and the pump drives.

This invention is primarily directed to hose assembly 13 which provides the hydrostatic drive system package with a high degree of reliability, particularly in the event of fluid leakages occurring therein. Since the pair of hose assemblies employed are substantially identical in construction and arrangement to each other, only one hose assembly will be described in detail. In addition, it will be seen hereinafter that the mounting assemblies 22, 22' for interconnecting opposite ends of the hose assembly between the motor and transmission are also basically similar.

Figure 2:
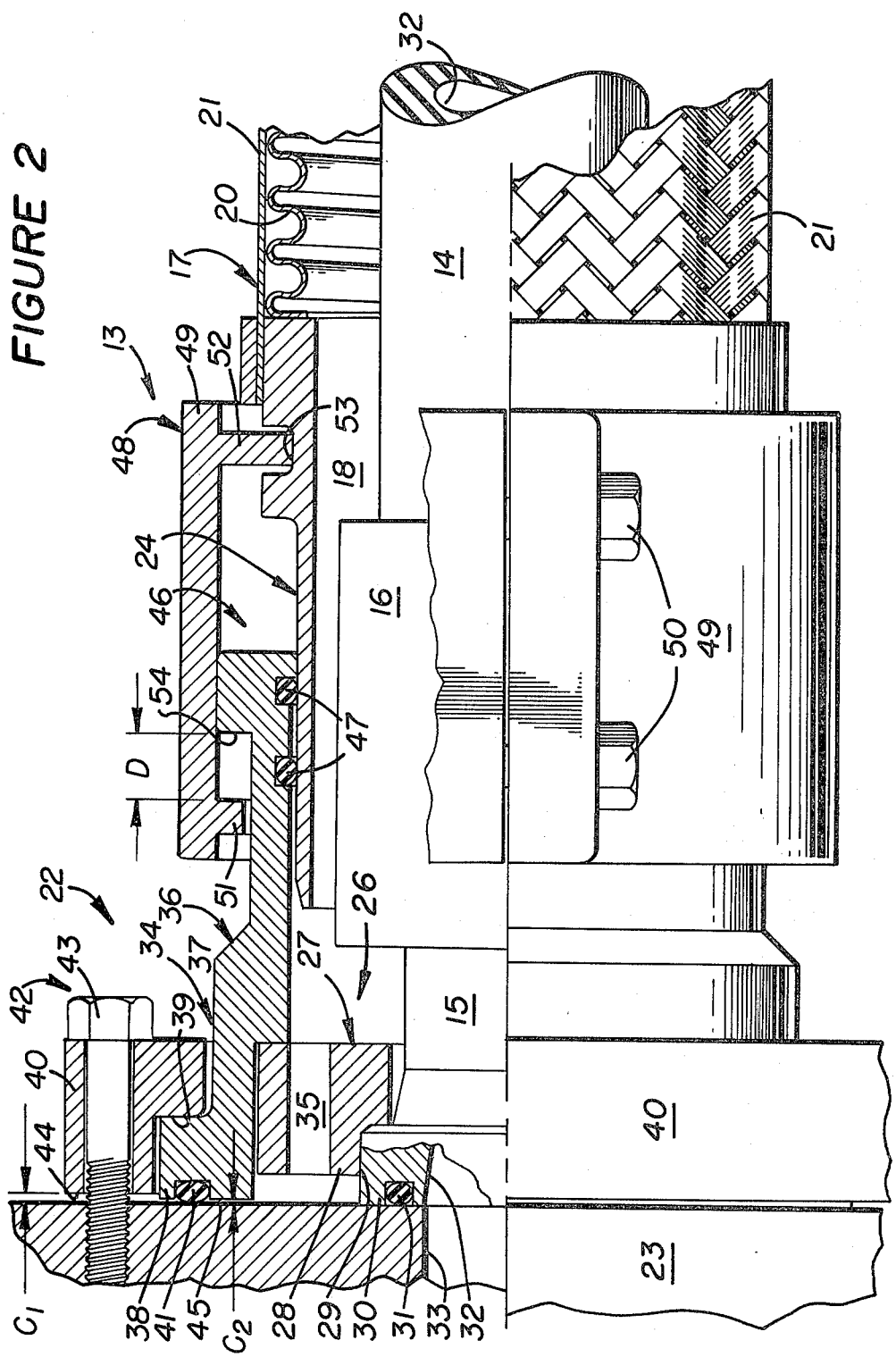

Referring to FIGS. 1 and 2, each hose assembly 13 includes a hose 14 connected to a mounting stem 15 by a coupling 16. The hose and coupling preferably constitute the commercially-available "Caterpillar XT-6 Hose and Coupling," manufactured by Caterpillar Tractor Co. of Peoria, Ill. High-pressure hoses and couplings of this type are adapted to supply hydraulic working fluids at a pressure level approximating 41,370 kPa.

In working environments wherein the transmission and motor are positioned at a substantial distance from each other, i.e., wherein the transmission, including the pump, is resiliently mounted to be driven by the engine thereof and the motor is mounted on the main frame and connected to the final sprocket drive, it is highly desirable to protect the hoses against abrasion and rubber degrading oils. In addition, when the loader operates in a working environment wherein ambient temperatures are quite high, e.g., a foundry, it is further desirable to provide the hoses with a heat shield to prevent conduction of ambient heat to the hydraulic fluid communicated through the hoses.

To this end, applicant's hose assembly 13 further includes an impervious flexible jacket 17 which surrounds hose 14 in out-of-contact relationship therewith to define an annular fluid chamber 18 therebetween. As illustrated in FIG. 1, a suitable fitting 19 is adapted to communicate low-pressure hydraulic fluid (e.g., 2,069 kPa) from chamber 18 to the sump of the hydrostatic drive system for recirculation purposes.

In the preferred embodiment of this invention, jacket 17 comprises a standard flexible hose including a corrugated stainless steel tubing 20 covered with a braided stainless steel sheath 21. The jacket may be of the type manufactured by Flexonics, Inc. of Bartlett, Ill. Mounting means 22 mounts the hose and jacket on a support member or housing 23 of motor 11 to maintain them in out-of-contact relationship relative to each other and to provide limited relative longitudinal movement therebetween for purposes hereinafter described.

Referring to FIGS. 2 and 3, mounting means or assembly 22 includes first mounting means 26 for mounting stem 15 of hose coupling 16 on motor housing 23 under a predetermined first sealing pressure in the range of 41,370 kPa. The first mounting means includes a clamp 27 having a pair of semi-circular clamping segments 28 defining a continuous annular clamping groove 29 thereon. An annular flanged head 30 of stem 15 is disposed in the groove and has an annular or O-ring seal 31 mounted therein to engage the outer face of housing 23 to form a high-pressure static seal thereat. A continuous passage 32, defined through stem 15 and hose 14, is thus adapted to communicate high-pressure hydraulic fluid to an inlet port 33 of motor 11.

Mounting assembly 22 further includes a second mounting means 34 for mounting jacket 17 about hose 14 and its attendant coupling 16 and on motor housing 23 under a predetermined second sealing pressure that is substantially less than the first sealing pressure maintained at high-pressure seal 31. In addition, the second mounting means functions to maintain the jacket in out-of-contact relationship relative to the hose to define fluid chamber 18 therebetween. As described more fully hereinafter, clamping segments 28 have a plurality of ports 35 formed axially therethrough to communicate any fluid leakage past seal 31 to chamber 18 for return to the sump of the drive system via connection 19 (FIG. 1).

Second mounting means 34 includes a tubular adapter 36 having an annular clamping groove 37 defined therein to engage clamp 27. A flanged head 38 of the adapter is disposed within an annular clamping groove 39, defined internally on a clamping ring 40, and has an annular or O-ring seal 41 mounted therein to engage motor housing 23 to form a low-pressure seal thereat, e.g., in the range of 2,069 kPa.

A common fastening means 42, shown in the form of a plurality of circumferentially-disposed bolts 43, is adapted to simultaneously form the high-pressure seal at seal 31 and the relatively low-pressure seal at seal 41. These relative sealing pressures are automatically obtained by providing a clearance $C_1$ (shown exaggerated in FIG. 2) between a frontal surface 44 of clamping ring 40 and motor housing 23, and a smaller clearance $C_2$ between a frontal surface 45 of adapter 36 and the motor housing. Flanged heads 30 and 38, segment clamp 27, and clamping ring 40 are suitably dimensioned so that when bolts 43 are torqued-down to effect the high sealing pressure at seal 31 (e.g., 41,370 kPa), clearances $C_1$ and $C_2$ will automatically effect a relatively low sealing pressure at seal 41 (e.g., 2,069 kPa).

Still referring to FIGS. 2 and 3, hose assembly 13 preferably also includes a slip coupling 46 for permitting relative axial movement to occur between sleeve 24 and adapter 36, and thus between jacket 17 and motor housing 23. This relative movement may occur due to pressure expansion or contraction, or due to pulling forces imposed on the jacket. The slip coupling includes a pair of axially-spaced low-pressure O-ring seals 47 (2,069 kPa) mounted between the sleeve and adapter. In addition, the slip coupling is preferably accompanied by a retaining means 48 for continuously ensuring sealing contact at seals 47 within a limited range of axial movement between the adapter and sleeve.

As shown in FIG. 2, the retaining means includes an annular two-piece sleeve 49 clamped together by bolts 50, and a pair of annular flanges 51 and 52 extending radially inwardly from the sleeve. Flange 52 engages within an annular groove 53, formed on the periphery of sleeve 24, whereby sleeves 24 and 49 will move together axially. Assuming rightward movement of jacket 17 and sleeve 24 in FIG. 2 through an axial distance D, flange 51 will engage an axially opposed annular shoulder 54, formed on adapter 36 to extend radially outwardly therefrom, to prevent disconnection of the jacket from the motor and the loss of sealing at seals 47.

Referring once again to FIG. 1, a mounting assembly 22' for mounting the opposite end of hose assembly 13 on a manifold or housing 23' of transmission 12 is basically similar in construction and arrangement to mounting assembly 22. Identical numerals depict corresponding constructions with numerals depicting modified constructions in mounting assembly 22' being accompanied by a prime (') symbol. Mounting means 22' essentially differs from mounting means 22 in that an adapter 36' and clamping ring 40' are formed as an integral and combined member. Member 36',40', clamping segments 28, and the flanged head of mounting stem 15 are also adapted to attach the opposite end of hose assembly 13 to housing 23' of transmission 12 to provide a high-pressure seal at seal 31 (e.g., 41,370 kPa) and a relatively low pressure seal at seal 41 (e.g., 2,069 kPa).

Thus, mounting means 22' also includes first mounting means 26' for mounting hose 14 on a support member or housing 23' of transmission 12 under a predetermined first sealing pressure, and second mounting means 34' for mounting jacket 17 about the hose and on the transmission housing under a predetermined second sealing pressure at seal 41 that is less than the first sealing pressure at seal 31. In addition, second mounting means 34', including adapter 36', is secured to the jacket by a band clamp 25' to maintain the jacket in out-of-contact relationship relative to the hose to aid in defining fluid chamber 18 therebetween.

INDUSTRIAL APPLICABILITY

Hose assembly 13 finds particular application to a hydrostatic drive system for interconnecting a variable displacement pump of transmission 12 and a fluid motor 12 thereof. In a drive system of this type, a pair of such hose assemblies interconnect the pump and motor to provide a loop or continuous fluid circuit therebetween. The provision of impervious flexible jacket 17 in combination with flexible high-pressure hose 14 finds particular application to a hydrostatic drive system employed on a track-type vehicle, such as a track-type loader, that is operated in a high-temperature environment, such as in a foundry.

Jacket 17 will not only protect the hose against abrasion, and rubber degrading oils, but will also reduce conduction of ambient heat to the hose and the hydraulic fluid communicated therethrough. As discussed above, the formation of annular fluid chamber 18 between the hose and jacket will provide for the return of fluid to the sump of the drive system, via connection 19. In addition, the hose assembly facilitates initial factory assembly, disassembly for on-site servicing purposes, and maximizes utilization of duplicate parts.

The method for mounting hose assembly 13 on motor housing 23 comprises the following assembly steps: disposing high-pressure hose 14 within jacket 17 to define fluid chamber 18 therebetween, clamping the hose on motor housing 23 under a predetermined first sealing pressure at seal 31 to provide a high-pressure seal thereat, and clamping the jacket on the motor housing under a predetermined second sealing pressure at seal 41 that is less than the first sealing pressure.

More specifically with reference to FIG. 1, it is assumed that the component parts of the motor and of the hose assembly are disconnected, as generally shown in FIG. 3, and that the hose assembly has been secured to housing 23' of transmission 12 previously. Adapter 36 is moved rightwardly on sleeve 24 to facilitate the mounting of clamping segments 28 on flanged head 30 of mounting stem 15. The adapter is then moved leftwardly to its FIG. 1 position, whereafter clamping ring 40 is clamped in place on motor housing 23 by bolts 43. A standard torque wrench can be utilized to ensure the required clamping forces and resulting sealing pressures applied to seals 31 and 41. Thereafter, split sleeve 49 of retaining means 48 can be secured in place by bolts 50 in the manner described above.

The above-described hose assembly and method will accommodate tolerance errors and relative motion occurring between component parts of the hose assembly, precisely establish the sealing points in each mounting means 26, 34 and 26', 34', protect hose 14 against rubber degrading oils and heat, and isolate and recirculate fluid leakage to maintain adequate charge pressure in the system to prevent vehicle shutdown in the event of drive line failure.

Other aspects, objects, and advantages of this invention can be obtained from a study of the drawings, the specification, and the appended claims.

We claim:
1. A hose assembly (13) comprising:
a flexible high-pressure hose (14),
an impervious flexible jacket (17) surrounding said hose (14) in out-of-contact relationship therewith to define a fluid chamber (18) therebetween, and
mounting means (22) for mounting each of said hose (14) and said jacket (17) on a support member (23) and maintaining them in out-of-contact relationship relative to each other, said mounting means (22) including first means (26) for mounting said hose (14) on said support member (23) under a predetermined first sealing pressure and second means (34) for mounting said jacket (17) about said hose (14) and on said support member (23) under a predetermined second sealing pressure less than said first sealing pressure and for maintaining said jacket (17) in said out-of-contact relationship relative to said hose (14), said first means (26) including clamping means (27) for applying said first sealing presure in response to simultaneous application of said second sealing pressure and having port means (35) for communicating fluid therethrough and to said chamber (18).

2. The hose assembly (13) of claim 1 wherein said hose (14) is composed of a steel wire reinforced elastomer and said jacket (17) includes a corrugated metal tube (20) covered by a woven metal sheath (21).

3. The hose assembly (13) of claim 1 wherein said hose (14) has a mounting stem (15) secured thereto, said mounting stem (15) having a flanged head (30) and an annular first seal (31) between said flanged head (30) and said support member (23), and wherein said first means (26) includes said clamping means (27) for compressing against said flanged head (30) and compressing said first seal (31) under said first sealing pressure.

4. The hose assembly (13) of claim 3 wherein said clamping means (27) includes a member having a plurality of circumferentially-disposed ports (35) of said port means formed axially therethrough and communicating said first seal (31) with said chamber (18).

5. The hose assembly (13) of claim 3 wherein said clamping means (27) includes a pair of semi-circular clamping segments (28).

6. The hose assembly (13) of claim 3 wherein said second means (34') includes an integrally-formed clamping member (40') and tubular adapter (36'), an annular second seal (41) compressed between said adapter (36') and said support member (23') mounted on said clamp (27), and fastening means (42) for simultaneously compressing said annular first seal (31) under said first sealing pressure and said second seal (41) under said second sealing pressure, said jacket (17) being secured to said adapter (36').

7. The hose assembly (13) of claim 3 wherein said second means (34) includes a tubular adapter (36) mounted on said clamping means (27), an annular second seal (41) between said adapter (36) and said support member (23), a clamping ring (40) mounted on said adapter (36), and fastening means (42) for simultaneously compressing said clamping means (27) against said stem (15) and compressing said first seal (31) under said first sealing pressure and for compressing said clamping ring (40) against said adapter (36) and compressing said second seal (41) under said second sealing pressure.

8. The hose assembly (13) of claim 1 wherein said mounting means (22) includes a tubular adapter (36) secured to said support member (23) and further including retaining means (48) for freeing said jacket (17) for limited axial movement relative to said adapter (36).

9. The hose assembly (13) of claim 7 wherein said retaining means (48) includes a first sleeve (24) secured to an end of said jacket (17) and being sealingly and slidably mounted within said adapter (36) and a second sleeve (49) surrounding said first sleeve (24) and said adapter (36).

10. The hose assembly (13) of claim 9 wherein said retaining means (48) further includes an annular shoulder (54) formed on said adapter (36) and extending radially outwardly therefrom, an annular first flange (51) formed internally on said second sleeve (49) and extending radially inwardly therefrom in axial opposition to said shoulder (54), an annular groove (53) formed on said first sleeve (24), and a second flange (54)

formed internally on said second sleeve (49) and extending radially inwardly into said groove (53).

11. The hose assembly (13) of claim 1 wherein said support member (23) is a motor (11) and further including a transmission (12) including a fluid motor and a said mounting means (22,22') connecting respective ends of each of said hose (14) and said jacket (17) on a respective said motor (11) and transmission (12).

12. A mounting assembly (22) for mounting a hose (14) and a jacket (17) on a support member (23), said mounting assembly (22) comprising:
first means (26) for mounting and sealing said hose (14) in face-to-face relationship on said support member (23) under a predetermined axial first sealing pressure, and
second means (34) for mounting and sealing said jacket (17) about said hose (14) and in face-to-face relationship on said support member (23) under a predetermined axial second sealing pressure that is substantially less than said first sealing pressure, maintaining said jacket (17) in out-of-contact relationship relative to said hose (14), and defining a fluid chamber (18) therebetween, said second means (34) being disposed radially outwardly from said first means (26) and said first means (26) including a separate annular clamp (27) positioned to apply said first sealing pressure in response to simultaneous application of said second sealing pressure.

13. The mounting assembly (22) of claim 12 wherein said hose (14) is composed of a steel wire reinforced elastomer and said jacket (17) includes a corrugated metal tube (20) covered by a woven metal sheath (21).

14. The mounting assembly (22) of claim 13 wherein said hose (14) has a mounting stem (15) secured thereto, said mounting stem (15) having a flanged head (30) thereon and an annular first seal (31) between said flanged head (30) and said support member (23) and wherein said clamp (27) is positioned and adapted to compress against said flanged head (30) and compress said first seal (31) under said first sealing pressure.

15. The mounting assembly (22) of claim 14 wherein said clamp (27) has a plurality of circumferentially-disposed ports (35) formed axially therethrough and communicating said first seal (31) with said chamber (18).

16. The mounting assembly (22) of claim 14 wherein said clamp (27) includes a pair of semi-circular clamping segments (28).

17. The mounting assembly (22) of claim 14 wherein said second means (34) includes an integrally-formed clamping member (40') and tubular adapter (36'), an annular second seal (41) between said adapter (36') and said support member (23') mounted on said clamp (27), and fastening means (42) for simultaneously compressing said annular first seal (31) under said first sealing pressure and said second seal (41) under said second sealing pressure, said jacket (17) being secured to said adapter (36').

18. The mounting assembly (22) of claim 14 wherein said second means (34) includes a tubular adapter (36) mounted on said clamp (27), an annular second seal (41) between said adapter (36) and said support member (23), a clamping ring (40) mounted on said adapter (36), and fastening means (42) for simultaneously compressing said clamp (27) against said stem (15) and compressing said first seal (31) under said first sealing pressure and for compressing said clamping ring (40) against said adapter (36) and compressing said second seal (41) under said second sealing pressure.

19. The mounting assembly (22) of claim 12 wherein said second means (22) includes a tubular adapter (36) secured to said support member (23) and further including retaining means (48) for freeing said jacket (17) for limited axial movement relative to said adapter (36).

20. The mounting assembly (22) of claim 19 wherein said retaining means (48) includes a first sleeve (24) secured to an end of said jacket (17) and sealingly and slidably mounted within said adapter (36) and a second sleeve (49) surrounding said first sleeve (24) and said adapter (36).

21. The mounting assembly (22) of claim 20 wherein said retaining means (48) further includes an annular shoulder (54) defined on said adapter (36) and extending radially outwardly therefrom, an annular first flange (51) formed internally on said second sleeve (49) and extending radially inwardly therefrom in axial opposition to said shoulder (54), an annular groove (53) formed on said first sleeve (24), and a second flange (54) formed internally on said second sleeve (49) and extending radially inwardly into said groove (53).

22. A hydrostatic drive system (10) comprising
a fluid motor (11),
a transmission (12) including a variable displacement pump,
a pair of hose assemblies (13) interconnected between said motor (11) and said transmission (12) and forming a continuous fluid circuit therebetween,
each of said hose assemblies (13) including:
a flexible high-pressure hose (14),
an impervious flexible jacket (17) surrounding said hose (14) in out-of-contact relationship therewith and defining a fluid chamber (18) therebetween, and
means (22,22') for respectively mounting ends of said hose (14) and said jacket (17) on said motor (11) and transmission (12) and including
first means (26,26') for mounting and sealing said hose (14) on each of said motor (11) and transmission (12) under a predetermined first sealing pressure, and
second means (34,34') for mounting and sealing said jacket (17) about said hose (14) and on each of said motor (11) and transmission (12), under a predetermined second sealing pressure that is substantially less than said first sealing pressure, maintaining said jacket (17) in out-of-contact relationship relative to said hose (14), and defining a fluid chamber (18) therebetween,
said hose (14) including a mounting stem (15) secured to each end thereof, said mounting stem (15) having a flanged head (30), and an annular first seal (31) positioned axially between said flanged head (30) and a respective one of said motor (11) and said transmission (12), said first means (26,26') including clamping means (27) for applying a clamping force against said flanged head (30) to compress said first seal (31) under said first sealing presure, said second means (34,34') including a tubular adapter (36,36') mounted on said clamping means (27), an annular second seal (41) positioned axially between said adapter (36,36') and a respective one of said motor (11) and said transmission (12), a clamping ring (40,40') on said adapter (36,36'), and fastening means (42) for simultaneously compressing said clamping means (27) against said stem (15)

and compressing said first seal (31) under said first sealing pressure and for compressing said clamping ring (40,40') against said adapter (36,36') to compress said second seal (41) under said second sealing pressure.

23. The hydrostatic drive system (10) of claim 22 wherein said hose (14) is composed of a steel wire-reinforced elastomer and said jacket (17) includes a corrugated metal tube (20) covered by a woven metal sheath (21).

24. A hose assembly (13) comprising:
a flexible high-pressure hose (14),
an impervious flexible jacket (17) surrounding said hose (14) in out-of-contact relationship therewith to define a fluid chamber (18) therebetween,
mounting means (22) for mounting each of said hose (14) and said jacket (17) on a support member (23) and maintaining them in out-of-contact relationship relative to each other, said mounting means (22) including a tubular adapter (36) secured to said support member (23), and
retaining means (48) for freeing said jacket (17) for limited axial movement relative to said adapter (36), said retaining means (48) including a first sleeve (24) secured to an end of said jacket (17) and being sealingly and slidably mounted within said adapter (36) and a second sleeve (49) surrounding said first sleeve (24) and said adapter (36).

* * * * *